United States Patent
Rehfuss

(10) Patent No.: US 9,616,775 B2
(45) Date of Patent: Apr. 11, 2017

(54) SEAT DEPTH ADJUSTMENT DEVICE FOR A VEHICLE SEAT

(71) Applicant: Dr. Ing. h.c. F. Porsche Aktiengesellschaft, Stuttgart (DE)

(72) Inventor: Benjamin Rehfuss, Rutesheim (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 80 days.

(21) Appl. No.: 14/727,920

(22) Filed: Jun. 2, 2015

(65) Prior Publication Data

US 2015/0352980 A1 Dec. 10, 2015

(30) Foreign Application Priority Data

Jun. 5, 2014 (DE) .................. 10 2014 107 925

(51) Int. Cl.
*A47C 7/14* (2006.01)
*B60N 2/02* (2006.01)

(52) U.S. Cl.
CPC ......... *B60N 2/0284* (2013.01); *B60N 2/0232* (2013.01); *B60N 2002/024* (2013.01)

(58) Field of Classification Search
USPC .................................... 297/284.11
See application file for complete search history.

(56) References Cited

U.S. PATENT DOCUMENTS

| | | | | | |
|---|---|---|---|---|---|
| 3,813,151 | A | * | 5/1974 | Cadiou | A47C 7/38 297/396 |
| 4,324,431 | A | * | 4/1982 | Murphy | B60N 2/62 297/284.11 |
| 4,541,669 | A | * | 9/1985 | Goldner | B60N 2/62 297/284.11 |
| 4,773,703 | A | * | 9/1988 | Krugener | B60N 2/0284 297/284.1 |
| 4,792,185 | A | * | 12/1988 | Oshikawa | B60N 2/62 248/592 |
| 6,106,063 | A | * | 8/2000 | Dauphin | A47C 1/023 297/284.1 |

(Continued)

FOREIGN PATENT DOCUMENTS

| | | |
|---|---|---|
| DE | 41 04 440 | 10/1991 |
| DE | 43 39 114 | 5/1995 |

(Continued)

OTHER PUBLICATIONS

Combined Search and Examination Report Dated Oct. 30, 2015.
German Search Report of Mar. 9, 2015.

*Primary Examiner* — David R Dunn
*Assistant Examiner* — Alexander Harrison
(74) *Attorney, Agent, or Firm* — Gerald E. Hespos; Michael J. Porco; Matthew T. Hespos

(57) ABSTRACT

A seat depth adjustment device for a vehicle seat has a seat structure (3) that includes a support plate (6) that is displaceable relative to the seat structure (3) with the aid of a linear guide (7) of the seat structure (3). The seat structure (3) is designed for receiving an upholstery cover. The upholstery cover is pretensioned with the aid of a cover return (22), and wherein the cover return (22) is connected to the support plate (6). Accordingly, the cover return (22) is connected to the support plate (6) in a manner positionable infinitely variably.

4 Claims, 4 Drawing Sheets

(56) References Cited

U.S. PATENT DOCUMENTS

| | | | |
|---|---|---|---|
| 6,419,317 B1 | 7/2002 | Westrich | |
| 6,926,361 B2* | 8/2005 | Link | A47C 1/023 |
| | | | 297/284.11 |
| 7,597,398 B2* | 10/2009 | Lindsay | B60N 2/0224 |
| | | | 297/283.2 |
| 7,669,928 B2* | 3/2010 | Snyder | B60N 2/0232 |
| | | | 297/283.2 |
| 7,669,929 B2* | 3/2010 | Simon | B60N 2/0224 |
| | | | 297/284.11 |
| 7,909,401 B2* | 3/2011 | Hofmann | B60N 2/0284 |
| | | | 297/284.11 |
| 8,684,459 B2* | 4/2014 | Teufel | B60N 2/0232 |
| | | | 297/284.11 |
| 9,016,785 B2* | 4/2015 | Freisleben | B60N 2/0232 |
| | | | 297/284.11 |
| 2002/0113473 A1* | 8/2002 | Knaus | A47C 31/02 |
| | | | 297/284.11 |
| 2003/0155797 A1* | 8/2003 | Amirault | B60N 2/2851 |
| | | | 297/250.1 |
| 2007/0102985 A1* | 5/2007 | Taniguchi | B60N 2/0284 |
| | | | 297/423.36 |
| 2009/0033134 A1 | 2/2009 | Hofmann et al. | |
| 2011/0254335 A1* | 10/2011 | Pradier | B60N 2/0232 |
| | | | 297/284.11 |
| 2013/0320730 A1 | 12/2013 | Aselage | |

FOREIGN PATENT DOCUMENTS

| | | |
|---|---|---|
| DE | 10 2009 012 780 | 7/2010 |
| DE | 20 2013 102 108 | 10/2013 |
| EP | 1 984 206 | 12/2009 |

* cited by examiner

SEAT DEPTH ADJUSTMENT DEVICE FOR A VEHICLE SEAT

CROSS REFERENCE TO RELATED APPLICATION

This application claims priority under 35 USC 119 to German Patent Appl. No. 10 2014 107 925.6 filed on Jun. 5, 2014, the entire disclosure of which is incorporated herein by reference.

BACKGROUND

1. Field of the Invention

The invention relates to a seat depth adjustment device for a vehicle seat.

2. Description of the Related Art

Seat depth adjustment devices for vehicle seats are known. A support is formed on a seat structure and is moveable relative to the seat structure to vary a seat depth of the seat structure. The support can be adjusted mechanically or with the aid of an electric drive.

DE 20 2013 102 108 U1 discloses a seat depth adjustment device with a basic support and a support plate. The support plate is pretensioned toward the basic support with the aid of a spring to simplify manual operation of an adjustment of the seat cushion depth.

DE 10 2009 012 780 B3 discloses a seat depth adjustment device with a basic support connected fixedly to a seat structure. A support plate is on the basic support and is displaceable relative to the basic support with the aid of an electric drive.

EP 1 984 206 B1 relates to a seat depth adjustment device wherein the seat cushion adjustment has an electric drive for relative displacement of a support plate on a seat structure. The support plate is moveable relative to the seat structure, and therefore a seat depth of the seat structure can be changed. In addition, a spring is formed to assist the relative displacement. A cover return for adapting an upholstery cover is formed structurally and functionally with the seat cushion adjustment. The cover return is formed with the aid of a plate that has a perforated toothing and is accommodated moveably on the basic support. The plate is moved relative to the basic support via a pinion that is accommodated on the basic support and is connected mechanically to the perforated toothing. A rod is connected at both ends to the upholstery cover and is fastened to the plate. The rod is formed transversely with respect to a direction of movement of the support plate. During a movement of the support plate, the plate is moved with the aid of the pinion engaging in the perforated toothing, and therefore the rod is moved relative to the seat structure in a manner corresponding to the direction of movement via the movement of the plate. An annoying noise occurs during a movement of the plate because of the pinion engaging in the perforated toothing and meshing between the perforated toothing and the pinion.

It is an object of the invention to provide a seat depth adjustment device for a vehicle seat, with a cover return that is free from noise.

SUMMARY OF THE INVENTION

The seat depth adjustment device according to the invention for a vehicle seat has a support plate that is displaceable relative to a seat structure of the vehicle seat. The support plate is moveable relative to the seat structure with the aid of a linear guide of the seat structure. The seat structure is designed for receiving an upholstery cover that is pretensioned with the aid of a cover return by, for example, two spiral springs. The cover return is connected operatively to the support plate so that the cover return is connected to the support plate to be positioned in an infinitely variably manner. The advantage is a production of a noise-free cover tensioning of the upholstery cover during a movement of the support plate relative to the seat structure.

The cover return may have a retaining element with a first end connected to the upholstery cover and a second end connected fixedly to the seat structure to define the sole fixing point of the upholstery cover to the seat structure. Thus, the upholstery cover may be fixed to the seat structure with the aid of the retaining element so that only a limited movement of the upholstery cover is possible. A simple operative connection can therefore be produced between the upholstery cover, the support plate and the seat structure. The spiral springs ensure a very climatically stable connection.

The seat structure may have a basic support that is connected fixedly to the seat structure. The linear guide may be formed in the basic support, and the retaining element of the cover return may be fixed to the basic support. Thus, an uncomplicated mounting of the cover return is possible since the cover return can be mounted on the basic support that is substantially more handy than the seat structure, and, after the mounting of said cover return, the basic support can be fastened immovably to the seat structure by the cover return connected thereto.

The cover return has a two-part retaining element that permits a first part of the retaining element to be formed as an elastic element and a second part of the retaining element to be formed as an inelastic element. The first part of the retaining element provides elastic pretensioning so that a pretensioning of the upholstery cover is maintained irrespective of the positioning of the support plate. The second part of the retaining element functions for secure and stable guidance of the retaining element. An inelastic or only slightly elastic retaining element would limit positioning of the support plate since too great a displacement of the support plate relative to the seat structure could cause too much tension in the upholstery cover, and therefore could damage the upholstery cover, for example in the form of cracks. An exclusively elastic retaining element would have the disadvantage of too flexible a tensioning of the upholstery cover and unsecured guidance. However, a crease-free and secured cover return is realized by the seat depth adjustment device according to the invention.

The first part of the retaining element is connected at one end to the basic support and at the other end to the second part of the retaining element. Thus, the second part of the retaining element is connected at one end to the first part of the retaining element and at the other end to the upholstery cover. Thus, the first part of the retaining element may be a single spiral spring that can be accommodated at least partially in the basic support or on the seat structure, and the second part of the retaining element can be a band. The band advantageously can be relatively wide and thin, and therefore tensile forces act over the relatively large band width to tension the upholstery cover. By contrast, the small band thickness advantageously requires little construction space, is climatically stable and is free from noise.

The use of a spiral spring as the elastic first part of the retaining element improves the visual appearance of the upholstery cover because of a relatively constant tensioning force of the spiral spring, particularly in the case of long spiral springs with a low spring rate.

The second part of the retaining element may have at least two changes in direction of action. Thus, the inelastic second part of the retaining element may be defelected in the direction of action thereof so that a relatively constant force acts on the transverse stitched-down seam. The second part of the retaining element can be deflected in a simplified manner on the basic support.

The cover return may have a damping tube in the region of the elastic retaining element for further damping possible noise by the elastic retaining element. A spiral spring that can surround the damping tube can be an elastic retaining element.

The mounting time of the upholstery cover can be reduced by a cover return with a connecting element for the releasable connection to a transverse stitched-down seam of the upholstery cover. The connecting element can be hook-shaped, and therefore can simply be hooked into the transverse stitched-down seam to enable a simple connection or release of the upholstery cover to or from the cover return.

A passage opening may completely penetrate the cover return to permit a simple connection between the cover return and the translatory movement of the support plate. In other words, the passage opening forms a type of eyelet that can receive the inelastic second part of the retaining element. The retaining element is connected to the upholstery cover on the side of the support plate that faces the upholstery cover. On the other hand, the retaining element is fixed to the basic support or the seat structure on the side of the support plate that faces the basic support or the seat structure. The retaining element is mounted in the passage opening, and thus can be carried along by the support plate when the support plate is displaced relative to the seat structure. No further structural elements are required to transmit the movement of the support plate to the cover return.

Further advantages, features and details of the invention emerge from the description below of preferred exemplary embodiments and with reference to the drawing. The features and combinations of features mentioned above in the description and also the features and combinations of features mentioned below in the description of the figures and/or shown solely in the figures are useable in the respectively stated combination, and in other combinations or by themselves without departing from the scope of the invention. Identical reference numbers are assigned to identical or functionally identical elements. For reasons of clarity, it is possible that the elements are not provided in all of the figures with their reference number, but without losing the assignment of said reference numbers.

DETAILED DESCRIPTION

Figure 1:
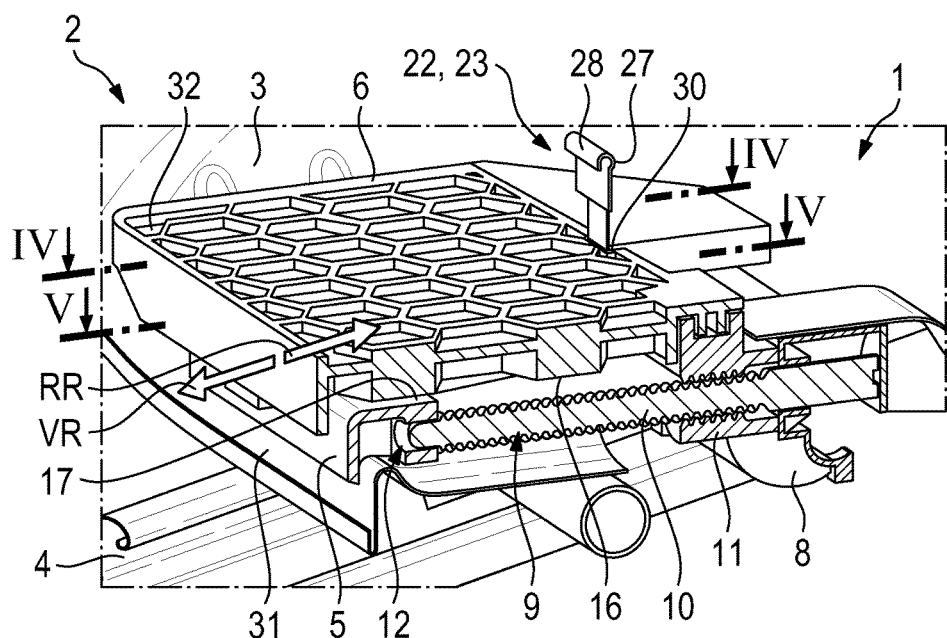
FIG. 1 is a perspective illustration of a cross section of a seat structure of a vehicle seat with a seat depth adjustment device according to the invention.

A seat depth adjustment device 1 for a vehicle seat 2 is illustrated in FIG. 1. The vehicle seat 2 comprises a seat structure 3 mounted on rails 4 and displaceable along a longitudinal direction of a vehicle (not illustrated specifically). The seat structure 3 is designed for receiving an upholstery cover (not illustrated specifically).

Figure 2:
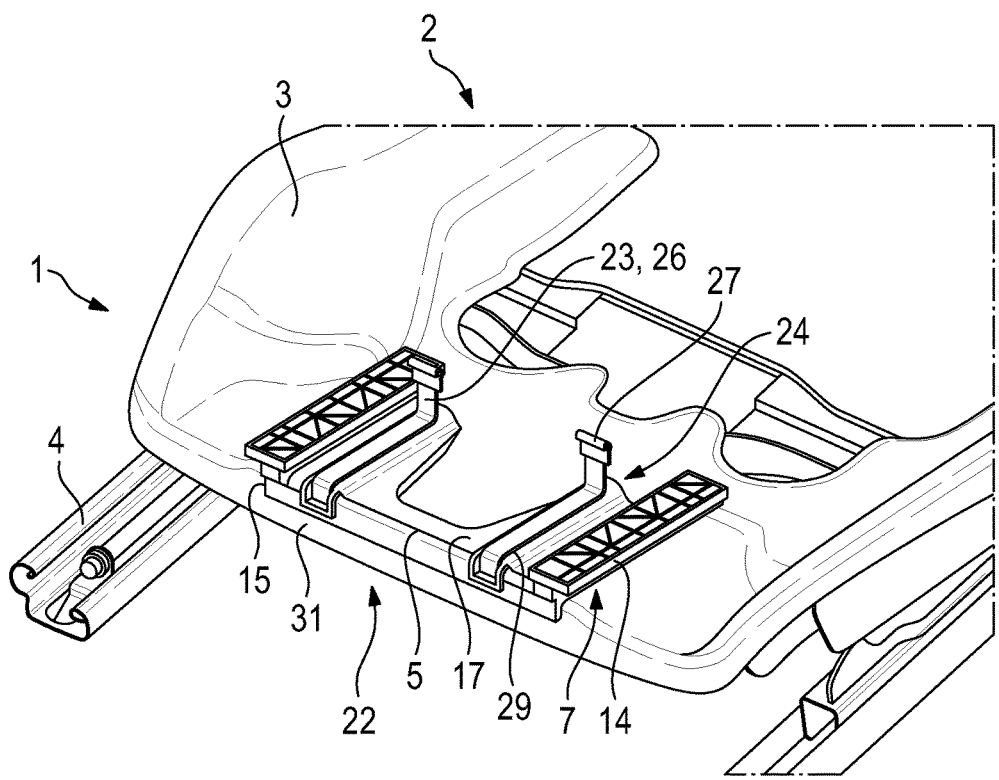
FIG. 2 is a perspective illustration of the seat structure of the vehicle seat with the seat depth adjustment device of FIG. 1 with a basic support.
Figure 3:
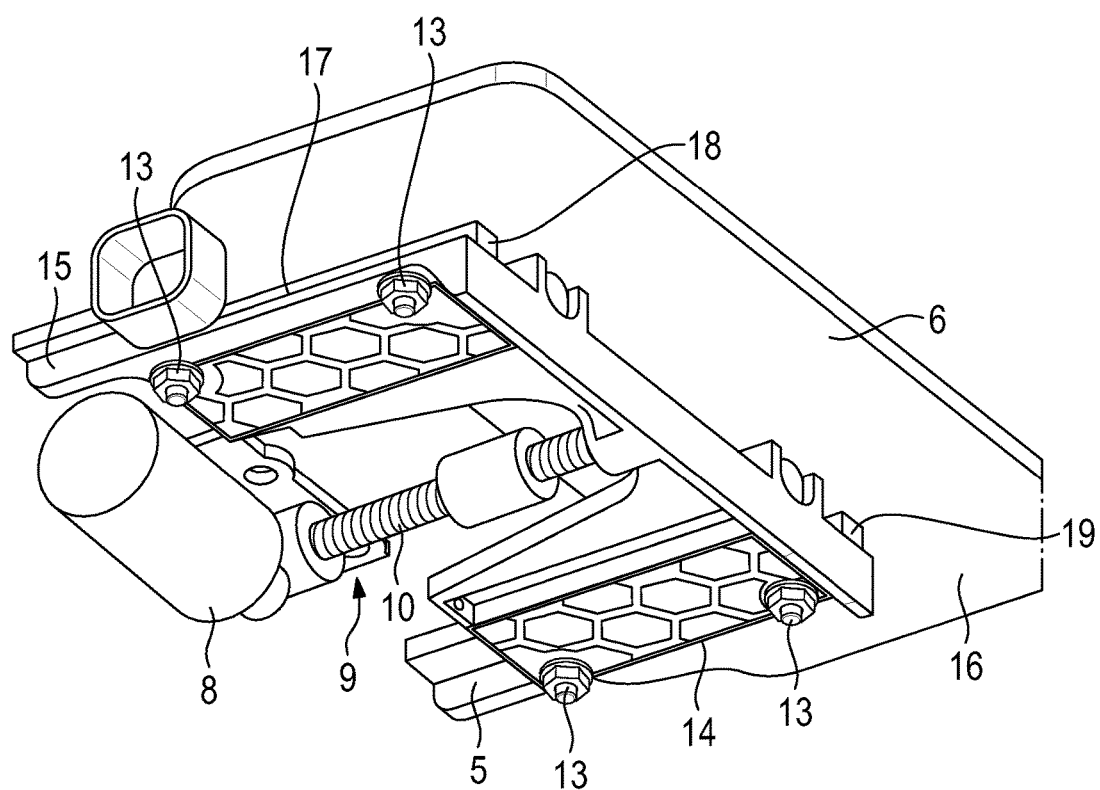
FIG. 3 is a perspective illustration of a basic support and a support plate of the seat depth adjustment device of FIG. 1 in a viewing direction onto a lower surface of the support plate and of the basic support.

The seat depth adjustment device 1 has a basic support 5 and a support plate 6. The basic support 5 is connected fixedly to the seat structure 3 by, for example, a screw connection 13, see FIG. 3, for simple mounting and dismounting. The basic support 5 has a linear guide 7 that is parallel to the vehicle longitudinal axis, see FIG. 2, and the support plate 6 is connected to the basic support 5 via the linear guide 7. The support plate 6 can translate relative to the seat structure 3 with the aid of the linear guide 7.

The basic support 5 is of U-shape and has opposite first and second side surfaces 14 and 15 that extend parallel to the vehicle longitudinal axis. The linear guide 7 is configured as a strip that is integral with the basic support 5.

Figure 4:
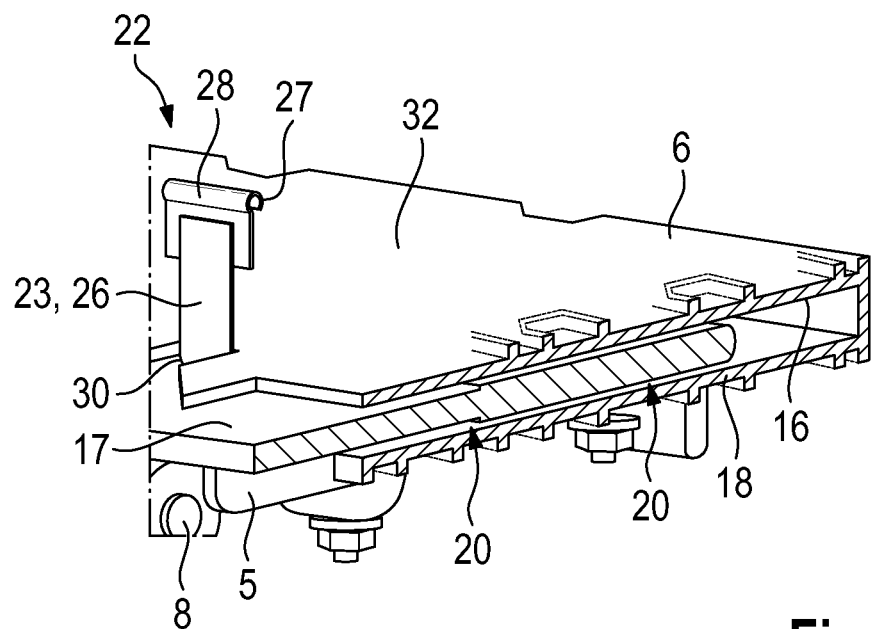
FIG. 4 is a perspective illustration of the basic support and the support plate in a section along line IV-IV.

The support plate 6 has a first lower surface 16 that faces a first upper surface 17 of the basic support 5. First and second receiving elements 18 and 19 are formed in the first lower surface 16 of the support plate 6 and can receive the strips of the basic support 5. A sliding mount 20 with defined supporting surfaces therefore is formed between the support plate 6 and the basic support 5, see FIG. 4.

Figure 5:
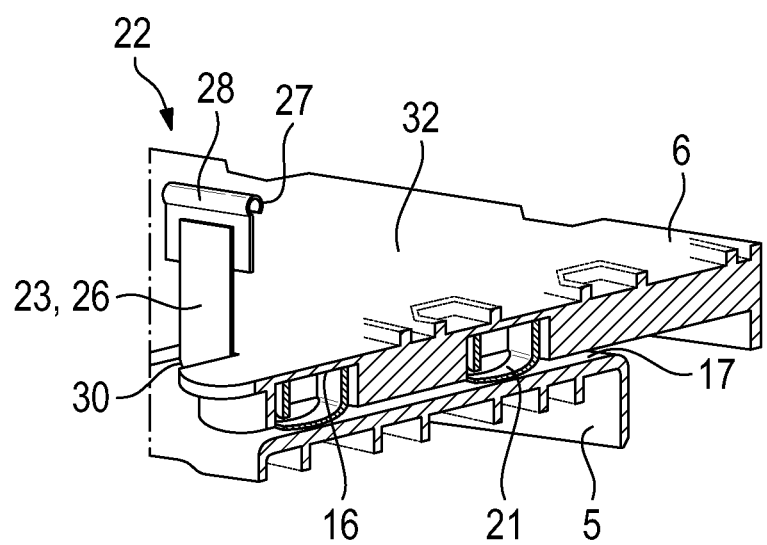
FIG. 5 is a perspective illustration of the basic support and the support plate in a section along line V-V.
Figure 6:
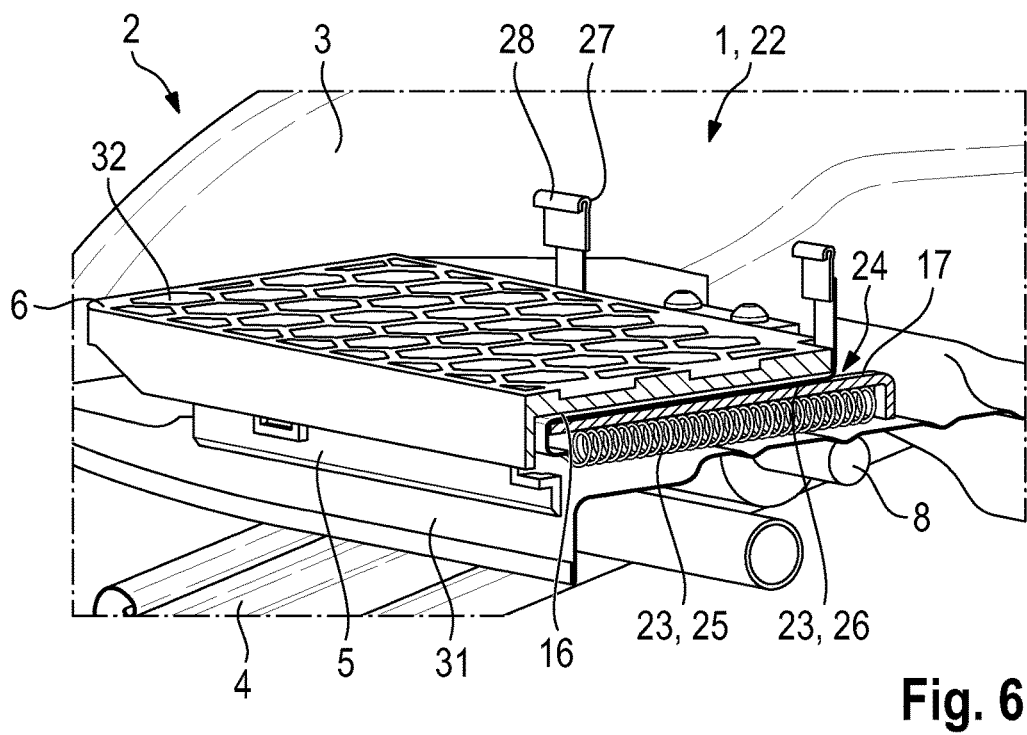
FIG. 6 is a perspective illustration of the seat structure of the vehicle seat with the seat depth adjustment device of FIG. 1 in a further section.
Figure 7:
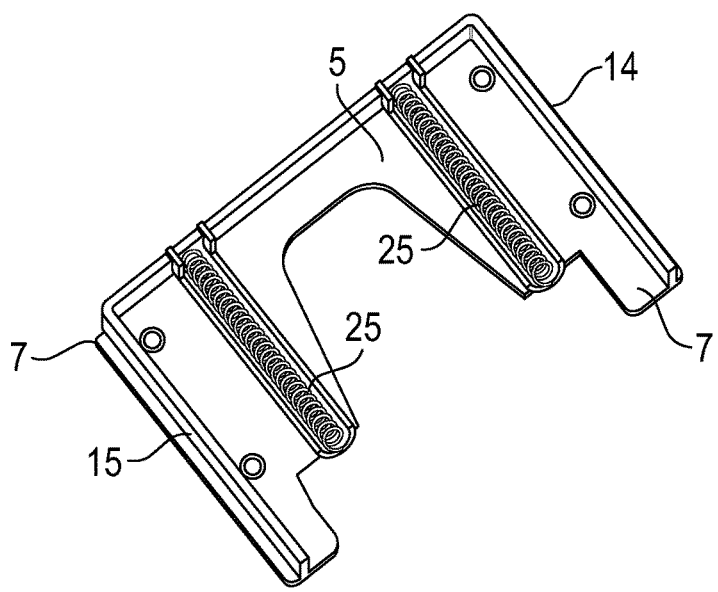
FIG. 7 is a perspective illustration of a lower surface of the basic support.

As shown in FIG. 5, springs 21 (for example made from metal), in particular two springs 21 per sliding mounting, are provided between the first upper surface 17 of the basic support 5 and the first lower surface 16 of the support plate 6 to reduce a Z play and to optimize seat depth adjustment play.

An electric drive 8 generates translation of the support plate 6 on the basic support 5. The electric drive 8 is connected via a spindle mechanism 9 that is connected both to the seat structure 3 and to the support plate 6. Rotation of the electric drive 8 rotates a spindle 10 of the spindle mechanism 9. A spindle slide 11 surrounds the spindle 10 and translates with the support plate 6 as the spindle 10 rotates. The end of the spindle 10 that faces a front edge 31 of the seat structure 3 is mounted a moveable bearing 12 on the basic support 5.

A seat structure 3 that is moveable exclusively along the rails 4 enables the support plate 6 to move in a forward direction VR and in a rearward direction RR opposed to the forward direction. According to the customary circumstances of a vehicle, the forward direction VR can be defined as the direction toward a front of the vehicle and the rearward direction RR as the direction toward the rear of the vehicle.

The electric drive 8 in the form of an electric motor is positioned on a lower surface of the seat structure 3 facing away from the basic support 5, and therefore improved seat comfort can be obtained.

The seat depth adjustment device 1 has a cover return 22, with a direction of action in the direction of the linear guide 7. The basic support 5 has a guide 24 to receive a retaining element 23 of the cover return 22. The guide 24 has as a groove that is parallel to the linear guide 7 and therefore in the direction of displacement of the support plate 6.

The retaining element 23 has an elastic first part 25 in the form of a spiral spring and an inelastic second part 26 in the form of a band. The first part 25 does not have to be a spiral spring, but rather could also be elastic in a different form, preferably in the direction of the longitudinal extent thereof. The second retaining element 26 need not be a band, but rather could also be constructed, for example, as a cable.

The spiral spring 25 is fixed at one end to the basic support 5 and is connected at the other end to the band 26. The end of the band 26 remote from the spiral spring 25 can be connected to the upholstery cover. For this purpose, a connecting element 27 is defined at the end of the band 26 remote from the spiral spring 25 and may be a hook 28 that can be hooked into a transverse stitched-down seam (not illustrated specifically) of the upholstery cover. In one embodiment, the transverse stitched-down seam has a receiving element of hook-like design, and the connecting element 27 may be an eyelet that can be hooked into the receiving element. Of course, the connection of the band 26 to the transverse stitched-down seam can be formed other variants.

To ensure a uniform return of the upholstery cover, the seat depth adjustment device 1 has two retaining elements 23 formed in the same manner. Accordingly, two guides 24 are formed on the basic support 5.

A releasable connection is preferably formed between the elastic retaining element part 25 and the inelastic retaining element part 26, and therefore simple mounting and dismounting can take place.

The spiral spring 25 is accommodated completely in its longitudinal extent in the basic support 5. The band 26 is guided from its end connected to the spiral spring 25 between the basic support 5 and the support plate 6, and therefore between the first lower surface 16 of the support plate 6 and the first upper surface 17 of the basic support 5 in the guide 24, the band 26 being arranged between guide strips 29 oriented in the longitudinal direction of the guide 24.

Passage openings 30 completely penetrate the support plate 6 at positions corresponding to the bands 26. The bands 26 penetrate the support plate 6 at the passage openings 30. Parts of the bands 26 opposite the spiral spring 25 are positioned on a second upper surface 32 of the support plate 6, which is opposite the first lower surface 16 and are connected to the upholstery cover with the aid of the connecting element 27. Therfore a connection is produced between the upholstery cover, the support plate 6 and the basic support 5. If the support plate 6 is displaced, an infinitely variable or, in other words, gridless cover return 22 is realized with the aid of a moveable bearing between the band 26 and the support plate with the aid of the passage opening 30.

When the support plate is displaced in the forward direction VR, the band end provided with the connecting element 27 is guided away from the second upper surface 32. The band 26 is inelastic. Thus, a band part positioned between the support plate 6 and the basic support 5 becomes shorter. If the support plate 6 is displaced in the rearward direction RR, the band end is guided closer to the second upper surface 32 and the band part positioned between the support plate 6 and the basic support 5 becomes longer. A certain elasticity during an "adjustment operation" of the support plate 6 is achieved with the aid of the spiral spring 25, and therefore an adapted tensioning of the upholstery cover is obtained at all times.

For the effective pretensioning of the upholstery cover, the spiral spring 25 is fixed to the basic support 5 at an end of the basic support 5 that faces away from the front edge 31, and therefore the band 26 deflects on the basic support 5 in a simple manner.

In this embodiment, the band is deflected on the basic support 5 with the aid of the support plate 6, and thus the band 26 has a direction of action virtually perpendicular to a tensioning direction of the spiral spring 25. The band 26 is arranged between the guide strips 29 from an edge of the basic support 5 facing the front edge 31 to an edge of the basic support 5 facing away from the front edge 31, and hence over virtually a complete length of the basic support 5.

A further deflection of the direction of action of the band 26 is formed due to the positioning in the passage opening 30. The passage opening 30 is configured in a region of the support plate 6 that faces away from the front edge 31. The angle of the band 26 in the region of the passage opening 30 is dependent on the positioning of the support plate 6. Owing to the guidance, the band 26 has at least two changes in direction of action in its longitudinal extent.

The basic support 5 and the support plate 6 are produced from a plastic and have a supporting structure of honeycomb-shape. Therefore, the components 5, 6 are relatively thin and light weight, with simultaneously high stability.

The spiral spring 25 may be equipped with a damping tube.

An additional deflecting edge may be formed on the basic support 5 in the vicinity of the passage opening 30, and therefore the support plate can be used both in front seats and in rear seats.

What is claimed is:

1. A seat depth adjustment device for a vehicle seat, comprising:
   a seat structure mounted on rails and displaceable in a longitudinal direction of the vehicle, at least a portion of the seat structure having an upholstery cover;
   a basic support fixedly connected to the seat structure and having a linear guide parallel to the longitudinal direction of the vehicle;
   a support plate having opposite upper and lower surfaces and at least one passage opening extending between the upper and lower surfaces, the lower surface arranged to face the basic support, and at least one receiving element formed on the lower surface and accommodating the linear guide, the support plate being displaceable relative to the seat structure and guided linearly by the linear guide;
   a cover return for pretensioning the upholstery cover during a movement of the support plate relative to the seat structure, the cover return including a retaining element comprising:
   an elastic first part having first and second ends spaced apart in the longitudinal direction of the vehicle, the first end being connected to the basic support; and
   an inelastic second part connected to the second end of the elastic first part and having a remote end spaced from the elastic first part and connected to the upholstery cover, a first portion of the inelastic second part extending from the elastic first part being disposed between the basic support and the support plate, and a second portion of the inelastic second part extending from the first part penetrating the passage openings of the support plate and being positioned on the upper surface of the support plate.

2. The seat depth adjustment device of claim 1, wherein the first part of the retaining element is a spiral spring.

3. The seat depth adjustment device of claim 1, characterized in that the second part of the retaining element has at least two changes in direction of action.

4. The seat depth adjustment device of claim 1, wherein the cover return produces an operative connection between the upholstery cover, the support plate and the basic support.

* * * * *